United States Patent
Woodson et al.

(10) Patent No.: US 7,215,754 B1
(45) Date of Patent: May 8, 2007

(54) METHOD AND SYSTEM FOR USER SELECTION FROM MULTIPLE PREDEFINED SERVICE PROFILE SETS

(75) Inventors: Charles Woodson, Peculiar, MO (US); Tom Sladek, Overland Park, KS (US); Baoquan (Alex) Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 358 days.

(21) Appl. No.: 10/374,456

(22) Filed: Feb. 25, 2003

(51) Int. Cl.
 *H04M 7/00* (2006.01)
 *H04Q 7/20* (2006.01)

(52) U.S. Cl. .............................. 379/221.09; 455/414.1; 455/432.3

(58) Field of Classification Search ............. 379/88.17, 379/88.19, 88.22, 93.01, 201.01, 201.03, 379/207.02, 207.11, 211.01, 221.01, 219, 379/221.08, 221.09; 455/414.1, 415, 403, 455/418, 422.1, 432.3
See application file for complete search history.

(56) References Cited

U.S. PATENT DOCUMENTS

| | | | | |
|---|---|---|---|---|
| 6,031,904 A * | 2/2000 | An et al. | ............... | 379/201.02 |
| 6,067,456 A * | 5/2000 | Duran | ........................ | 455/461 |
| 6,317,484 B1 * | 11/2001 | McAllister | ............... | 379/88.02 |
| 6,453,164 B1 * | 9/2002 | Fuller et al. | ................. | 455/445 |
| 6,831,970 B1 * | 12/2004 | Awada et al. | ........... | 379/201.01 |
| 2002/0091797 A1 * | 7/2002 | Wallenius et al. | .......... | 709/218 |

\* cited by examiner

*Primary Examiner*—Ovidio Escalante (57) ABSTRACT

A method and system for subscriber selection from multiple predefined profile sets. The method comprises maintaining the multiple predefined profile sets for a subscriber in a communication network. Each of the predefined profile sets defines a respective configuration of multiple services to which the subscriber subscribes. The method then comprises receiving a request from the subscriber to make a given one of the predefined profile sets an active set for the subscriber and responsively making the given predefined profile set an active set for the subscriber.

20 Claims, 5 Drawing Sheets

| SERVICE A (VOICEMAIL) | SERVICE B (CALL FORWARDING) | SERVICE D (VOICE CALLING) |
|---|---|---|
| PARAMETERS<br><br>A1) SEND ALL CALLS<br>A2) SEND ALL CALLS NOT ON LIST 1<br>A3) PLAY MAIN GREETING<br>A4) PLAY ALTERNATE GREETING | PARAMETERS<br><br>B1) FORWARD ALL CALLS<br>B2) FORWARD ALL CALLS TO (555) 123-4567<br>B3) FORWARD ALL CALLS TO (555) 987-6543<br>B4) FORWARD URGENT CALLS | PARAMETERS<br><br>C1) LIST A<br><br>C2) LIST B |

Fig. 4

ONE (*631)
- SERVICE A - ACTIVE
  - PARAMETERS - A1, A4
- SERVICE B - INACTIVE
- SERVICE C - ACTIVE
  - PARAMETER - C1

TWO (*632)
- SERVICE A - ACTIVE
  - PARAMETERS - A2, A3
- SERVICE B - ACTIVE
  - PARAMETERS - B4, B3
- SERVICE C - ACTIVE
  - PARAMETER - C2

Fig. 7

Fig. 8

METHOD AND SYSTEM FOR USER SELECTION FROM MULTIPLE PREDEFINED SERVICE PROFILE SETS

BACKGROUND

I. Field of the Invention

The present invention is directed to communications. More particularly, the present invention is directed to methods and systems for maintaining and selecting profile sets for various communications services.

II. Description of Related Art

Advances in the telecommunications industry have led to the availability of a large number of communications services. Such services are available, often by subscription, to users of current communications networks. For example, some of these services include voicemail, selective ringing, voice-activated calling, selective call forwarding, and text messaging, among numerous other services. Additionally, many of these services have service parameters that can be used to modify their functionality.

In this regard, for example, a voicemail service may have multiple greetings that may be stored by a user. A user may use one of these greetings as a "primary" greeting, which callers will hear when the user does not answer an incoming call within a specified number of rings. Alternatively, all calls may be directly forwarded to the voicemail service and an alternate greeting may be used. The user may also use one of the available greetings as a "not available" greeting, which callers may hear when the user is either on the phone or out of the office.

As another example, call forwarding may be used to direct calls placed to the user's phone number to another phone number at which the user, or someone who is taking calls for the user, will be. This may be done non-discriminately, with all calls being forwarded to the other number. Alternatively, calls may be forwarded on a selective basis, such as the subscriber accepting calls only from certain numbers (which may be based on caller identification information), while all other calls are forwarded.

The availability of such services (among others), with corresponding service parameters, allows subscribers to adapt the services they use (or subscribe to) to their particular needs. Most subscribers, however, have different service preferences at different times. In this respect, a subscriber may desire that multiple services be configured in one way during business hours, such as when the subscriber is in his/her business office or normal place of business. However, the subscriber may prefer that those same services are configured in another way during business hours when traveling away from the subscriber's home office. Additionally, the subscriber may want the services configured in still other ways during weekday evening hours, on weekends, or when the subscriber is on vacation. These situations are, of course, exemplary.

In current communications systems, such services may be distributed across a number of platforms that are included in a communications network. A carrier with which the subscriber has obtained a phone number and access to a communications network of the carrier may provide some services. Other services may be provided by third parties (not by the carrier), which are included on platforms coupled with the communications network that the subscriber has access to through the carrier. For example, a voicemail service may be provided to the subscriber by the carrier, while a news and information service may be provided to the subscriber by a third party via the carrier's communications network. These various communications services also have various manners in which subscribers configure the services based on their individual preferences. The configuration for each of the multiple services for a respective subscriber is maintained in a profile for the subscriber.

In this regard, modifying how such services operate (e.g., modifying the subscriber's profile), so as to be consistent with the subscriber's preferences may be a time consuming process. For example, to change the configuration of the subscriber's voicemail service in the subscriber's profile, the subscriber dials into the voicemail service and then traverses an interactive voice response unit's (IVRU's) menu to enable or disable the voicemail service, select the type of calls to be forwarded to the service, select which greeting to use from multiple greetings, among any number of other options. The subscriber's profile is then updated to reflect any changes in the configuration of the voicemail service made by the subscriber using the IVRU.

Then, if the subscriber, for example, wishes to modify the configuration of a call forwarding service, the subscriber must disconnect from the IVRU. After the subscriber is disconnected from the IVRU, he/she may then modify the call forwarding service using, for example, a feature-code selection system. In this regard, the subscriber dials a certain key sequence (e.g. *23) and then enters (in this example) a call forwarding number and any criteria on which calls are forwarded (e.g. all calls or selective). The subscriber's profile may then be updated to reflect any changes made to the call forwarding service.

Other services may be configured in different manners. For example, the subscriber may configure a news and information service by contacting a customer service representative by phone, by accessing another IVRU (physically and functionally distinct from the voicemail IVRU), or by using a World Wide Web based interface. Other services (such as voice calling, selective ringing, etc.) are modified in a similar, one by one, and stepwise manner. Such an approach to configuring communications services is both time consuming and inefficient for the subscriber. Thus, alternative approaches may be desirable.

SUMMARY

According to an exemplary embodiment, a method for providing communications services to a subscriber comprises maintaining multiple predefined profile sets for a subscriber in a communication network, where each of the predefined profile sets defines a respective configuration of multiple services to which the subscriber subscribes. The method further includes receiving a request from the subscriber to make a given one of the predefined profile sets an active set for the subscriber. Such a request may be generated by any number of sources, such as a World Wide Web (WWW) based interface or a feature code selection systems, as some examples. The method still further comprises making the given predefined profile set an active set for the subscriber in response to the request In another exemplary embodiment, a method for providing communications services may also comprise prompting the subscriber to enter multiple profile sets, wherein each of the multiple profile sets defines a respective configuration of the multiple communication services to the which the subscriber subscribes. The prompting may take a number of forms, such as, for example, an interactive voice response unit or a WWW based interface. The method of this embodiment then further comprises receiving information from the subscriber to define the multiple profile sets, where the information is responsive to the prompting.

In yet another alternative, exemplary embodiment, a communication system comprises a communication network, which may include any number of platforms, such as switches, serving systems, central control points, among others. The system further includes data storage included in at least a first entity (e.g., a central control point or service management system) coupled with the network. The data storage is employed to maintain multiple predefined profile sets for a subscriber, where each of the multiple profile sets defines a respective configuration for multiple services to which the subscriber subscribes. The services are operable on one or more platforms coupled with the communication network. Such platforms include (without limitation) service nodes, IVRUs, among others. The system still further includes a second entity operable by the subscriber, such as landline telephone, mobile telephone, or computing device, as some examples. The second entity is communicatively coupled with the communication network, such that the second entity, when employed by the subscriber, transmits a request to the first entity to make a given profile set of the multiple profile sets an active set for the subscriber. This request is transmitted via the communication network, wherein the first entity, in response to the request, sets the given profile set to be an active set for the subscriber.

In still yet another alternative exemplary embodiment, a method for profile management comprises maintaining multiple predefined profile sets for a given subscriber in a communication network. Such profile sets may be maintained in/on any number of platforms coupled with the communication network. As previously described, each of the predefined profile sets defines a respective configuration for a plurality of network services for the subscriber. The multiple profile sets include a first profile set that defines a first configuration of a first service and a second configuration of a second service. The multiple profile sets further include a second profile set that defines a third configuration of the first service and a fourth configuration of the second service. The method comprises maintaining a designation of the first profile set as an active profile set for the subscriber in the communication network, so that the first service is configured for the subscriber according to the first configuration and the second service is configured for the subscriber according to the second configuration, in accordance with the profile set. The method then comprises receiving a signal from the subscriber to indicate a user-selection of the second profile set to be the active profile set. In response to this signal, the method then comprises setting the second profile set to be the active profile set for the subscriber. Setting the second profile set to be the active profile set comprise configuring the first service for the subscriber according to the third configuration and the second service according to the fourth configuration.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Overview

As was noted above, it may be time consuming and inefficient for a subscriber on a communication network to modify the configuration for multiple services to which the subscriber subscribes in a linear, one at a time fashion. The present invention addresses this problem by providing subscribers with corresponding multiple predefined profile sets. Each of these profile sets defines a respective configuration for each of the services to which the subscriber subscribes. In general, a subscriber selects a profile set from the predefined profile sets using any number of selection and/or signaling mechanisms. As a result of the subscriber's selection, the selected profile set becomes (is designated) the active profile set.

The services to which the subscriber subscribes are then responsively configured in accordance with the active profile set. Using such an approach, the subscriber may avoid modifying each service individually. The services may be configured in correspondence with the active profile set in any number of ways. For example, a platform in the communication system on which the subscriber's profile sets are maintained may signal one or more other platforms in the communication system that provides the multiple services, where these platforms that provide the services are included and/or coupled with the communications system. In response to this signaling, the one or more platforms may execute control logic to configure the multiple services in accordance with the selected profile. For purposes of this disclosure, such control logic may be implemented in hardware, software and/or firmware. The invention is, of course, not limited to any particular implementation technique for such logic.

Exemplary Embodiment for Selecting a Profile in a Communication System

Figure 1:
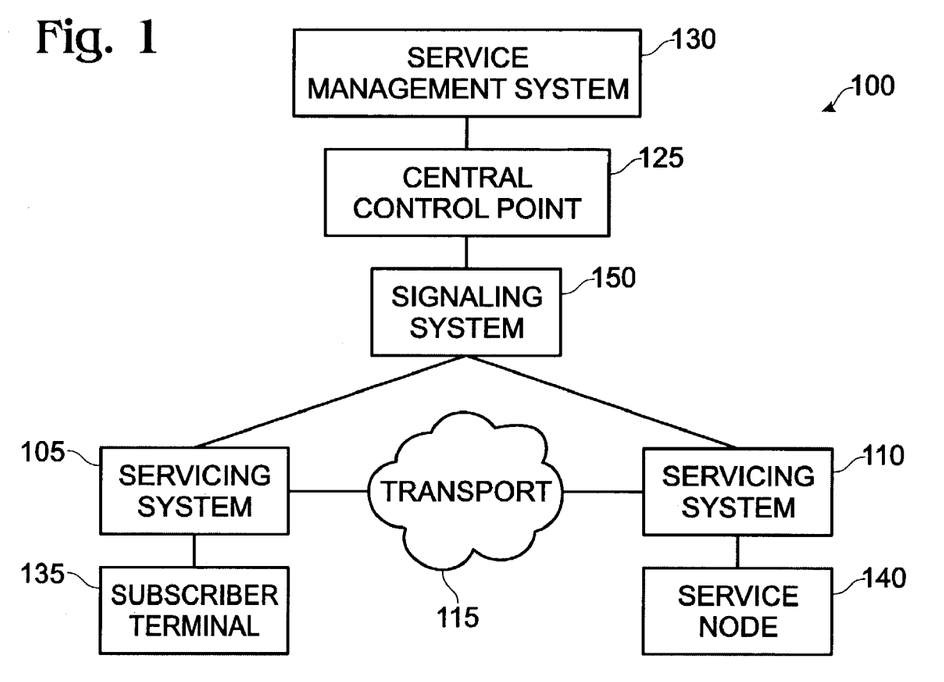
FIG. 1 is a simplified block diagram illustrating a communication network in which an exemplary embodiment of the invention can be employed.

Referring now to the drawings, FIG. 1 illustrates a simplified block diagram of a communications system 100 in which exemplary embodiments of the present invention may be implemented. As is shown in FIG. 1, the system 100 includes serving systems 105 and 110, which are both communicatively coupled to one another via a transport network 115 and to a signaling system 120. Serving systems 105 and 110 comprise communication switches, such as signal switching points for landline phone systems and/or mobile switching centers for wireless phone systems. Also, at least one central control point (CCP) 125 is communicatively coupled with the signaling system 120. In certain embodiments, the CCP 125 may take the form of a Telcordia ISCP System, as one example. The CCP 125 is further communicatively coupled with a service management system (SMS) 130, which may take the form of a Telcordia ASMS system, as an example.

For this embodiment, the SMS 130 may be used to maintain multiple profile sets for a subscriber and/or a device used by a subscriber, where each profile set contains a respective configuration for multiple communication services for the subscriber, as has been previously described. Alternatively, the multiple profile sets may be maintained in the CCP 125 or elsewhere. While such profile sets are described generally with respect to FIGS. 1 and 2, they are described in more detail hereinafter with respect to FIGS. 3 and 4.

A subscriber accesses the system 100 using a subscriber terminal 135, which is coupled with serving system 105. The communication services (e.g., voicemail, call forwarding, etc.) for which the multiple profile sets contain respective configurations may be implemented in the system 100 in any number of fashions. For example, a service node 140 (such as a Telcordia ISP), which is coupled with the serving system 110 in FIG. 1, may be used to implement one or more of the communication services alone and/or in conjunction with other platforms in the system 100. This approach is described by way of example and, of course, other approaches are possible. Alternatively, additional service nodes may be implemented, which may be coupled with the transport network 115 (via another serving system) or, alternatively, may be coupled directly with the serving systems 105 and 110 of FIG. 1. Additionally, one or more communication services may be implemented in the central control point 125, or in any number of other platforms (such as third party platforms, intelligent peripherals, etc.) that may be coupled with the system 100. In this respect, it will be appreciated that the specific implementation of the multiple communication services is not critical, and any number of arrangements may be employed.

Figure 2:
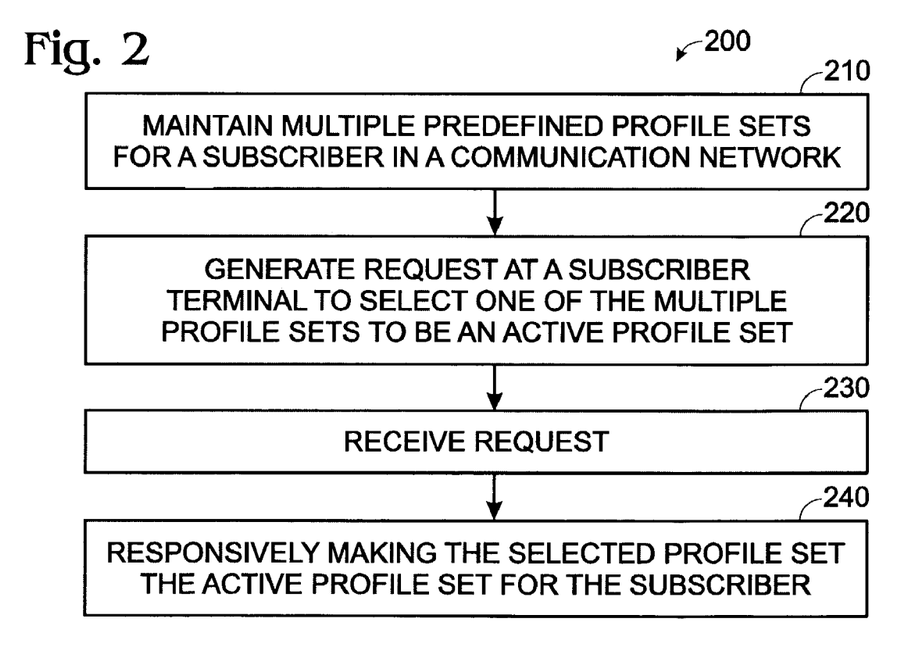
FIG. 2 is a flowchart illustrating a method for managing profile sets in accordance with an exemplary embodiment of the invention.

Referring now to FIG. 2, a flowchart illustrating a method 200 of selecting a profile is shown. At 210, the method 200 comprises maintaining multiple predefined profile sets for a subscriber in a communication network, such as may be accomplished with the system 100, as was previously described. Each of the predefined profile sets defines a respective configuration for multiple services that are implemented in a communication system, such as the system 100, to which the subscriber has access. At 220, the method 200 further comprises generating a request from the subscriber (e.g., via the subscriber terminal 135) to make a given one of the predefined profile sets an active set for the subscriber. The request from the subscriber may comprise a signal that is generated by the subscriber employing the subscriber terminal 135.

For this particular embodiment, as was noted above, the subscriber terminal 135, when employed by a subscriber, generates this signal to request that a specific profile set become an active profile set for the subscriber. The signal is then communicated to serving system 105, which in turn communicates the signal to signaling system 120. Signaling system 120 then communicates the signal to CCP 125, which, in turn, communicates the signal to the SMS 130. It will be appreciated that any number of signaling approaches may be used.

In this regard, such signaling techniques may include, without limitation, signals and/or messages in accordance with the TCAP and/or SS7 standards, which are known to those working in this area. However, it will be appreciated that the exact signaling approach used is not critical. In this respect, each transmission of the signal (active profile set request) between platforms (entities) in the system 100 may be accomplished using any protocol which the sending and receiving entity both implement and/or support, that is, the entities "agree" on the protocol. For example, when the subscriber terminal 135 generates such a active profile set request, the subscriber terminal 135 transmits the request to the serving system 105 using a protocol that is supported and/or understood by both the subscriber terminal 135 and the serving system 105. Subsequent transmissions of the request (e.g. from the serving system 105 up to the SMS 130) may be accomplished in similar fashion, though such transmissions are not necessarily limited to using the same protocol as was employed to communicate between the subscriber terminal 135 and the serving system 105.

It will also be appreciated that this example is illustrative and other signaling paths may used, such as via the transport network 115 and the serving system 110. Also, additional subscriber terminals may be included with the system 100, such as subscriber terminals that are coupled with the serving system 110. Those additional terminals may be associated with other subscribers, which may generate requests/signals to select from their respective predefined profile sets.

Referring again to FIG. 2, at 230, the method 200 comprises receiving the subscriber's request to make one of the predefined profile sets the active profile set. For this embodiment (again referring to FIG. 1), the signal/request is received at the SMS 130. The SMS 130 maintains the predefined profile sets for the subscriber and may also maintain a flag to indicate which of these profile sets is the currently active profile set for the subscriber. As a result of receiving the signal, the SMS 130 may modify the flag to indicate a change in the currently active profile set for the subscriber.

At 240, the SMS 130 then signals to the one or more platforms in the system 100 that implement the multiple services to which the subscriber subscribes to indicate that the subscriber's profile has been changed. The SMS 130 may maintain a list of services and the corresponding platforms that provide those services in the system 100. In this regard, when a profile set is selected, the platforms that the SMS 130 will signal to make the selected profile set the active profile set may be determined from this list. The signals from the SMS 130 may indicate the selected profile set and contain configuration information for the multiple services for the selected profile set. Of course, numerous other signaling options are possible. For example, the SMS 130 may signal the one or more platforms with the service logic that is to be executed by the respective platforms to configure the multiple services in correspondence with the currently active profile set. As with the signal generated by the subscriber terminal, the specific protocol used to communicate such signals is not critical.

As an example, assume that the service node 140 contains the multiple services to which the subscriber subscribes. The SMS 130 may transmit a message to the service node 140, which may be communicated via the CCP 125, the signaling system 120 and the serving system 110. Upon receiving this signal from the SMS 130, the service node 140 then executes service logic, which configures the multiple services in correspondence with the predetermined profile set selected by the subscriber to be the currently active profile set. This may be accomplished by modifying a local profile for the subscriber, where local profile sets are maintained on the service node 140. Of course, other techniques are possible.

Alternatively, the multiple services to which a respective subscriber subscribes may be implemented on multiple platforms in the system 100. In this situation, the SMS 130 generates a message to each of the multiple platforms on which the multiple services are implemented. These multiple platforms then each execute service logic to configure the multiple services in correspondence with the selected currently active profile set. The subscriber is, thus, able to configure the multiple services to which he/she subscribes by selecting a currently active profile set from the multiple predefined profile sets, such as in the fashion just described. This approach reduces the inefficiencies associated with the subscriber configuring the multiple services one at a time, as was previously described.

Exemplary Profile Sets

Figure 3:
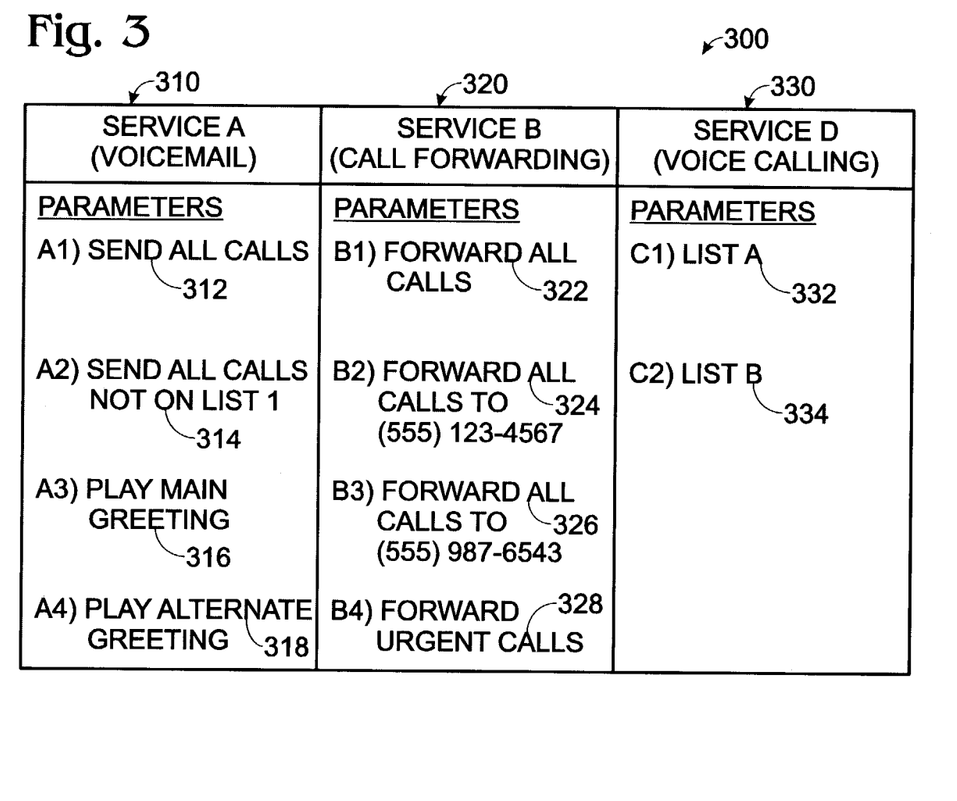
FIG. 3 is a diagram illustrating exemplary services and services parameters, which embodiments of the invention can employ.
Figure 4:
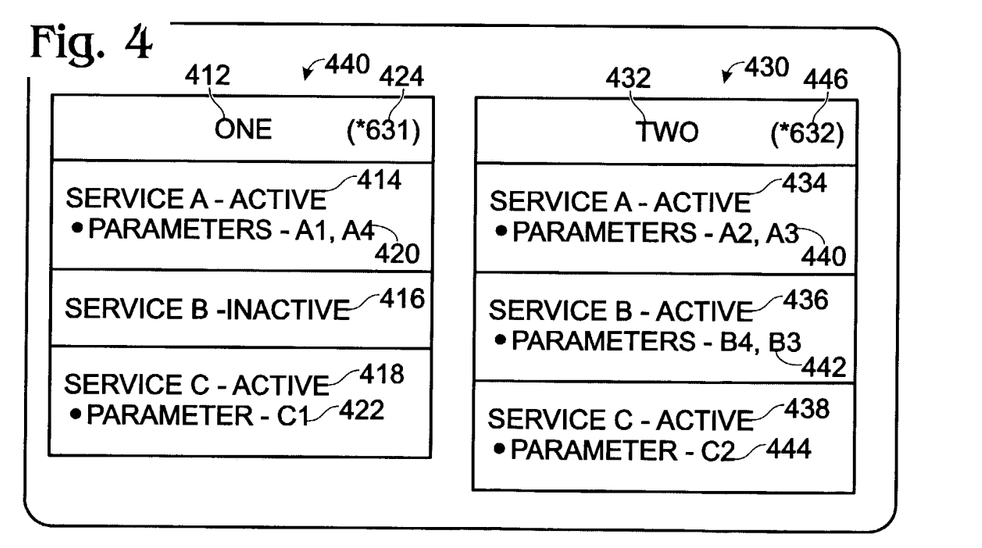
FIG. 4 is a diagram illustrating two exemplary profile sets for a subscriber, which may be employed with embodiments of the invention.

Referring now to FIG. 3, a table illustrating an exemplary set of multiple services 300 is shown. FIG. 4 illustrates multiple predefined profile sets 410 and 430 that comprise respective configurations for the multiple services shown in FIG. 3. As has been previously discussed, such predefined profile sets correspond to a respective subscriber of a communication system, such as a subscriber of the communication system 100 shown in FIG. 1.

The multiple services shown in FIG. 3 comprise a voicemail service 310 (also denoted Service A), a call forwarding service 320 (also denoted Service B) and a voice calling service 330 (also denoted Service C). Each of these services 310–330 also includes service parameters, which affect how the services are provisioned (or provided) to a respective subscriber. For purposes of this example, multiple designations are used for the services and service parameters to facilitate an understanding of the exemplary embodiment of multiple profile sets that will be discussed hereafter with respect to FIG. 4.

In this respect, the voicemail service 310 has a corresponding first service parameter 312 (also denoted 'A1'), which is used to configure the voicemail service 310 to receive all calls to a subscriber (such as to the subscriber's phone). The voicemail service 310 also has corresponding service parameters 314 (also 'A2'), which configures the voicemail service 310 to answer all calls not on a specific list (denoted List 1); 316 (also 'A3'), which configures the voicemail service 310 to play the subscriber's main voicemail greeting; and 318 (also 'A4'), which configures the voicemail service 310 to play the subscriber's alternate greeting. These parameters are, of course, exemplary, and any of them may be removed, substituted for, or added to, depending on the particular embodiment.

In a similar fashion, the call forwarding service 320 has corresponding service parameters 322, 324, 326 and 328. The service parameter 322 (also 'B1') configures the call forwarding service 320 to forward all calls to a subscriber. The service parameter 324 (also 'B2') configures the call forwarding service 320 to reroute forwarded calls to phone number (555) 123-4567. The service parameter 326 configures the call forwarding service 320 to reroute forwarded calls to phone number (555) 987-6543. The service parameter 328 configures the call forwarding service 320 to forwards urgent calls (which may be based on caller identification information, for example) to a designated number, such as one of the numbers defined by service parameters 324 and 326.

In a similar fashion as the voicemail service 310 and the call forwarding service 320, the voice calling service 330 has corresponding service parameters 332 and 334 (also, respectively 'C1' and 'C2'). The service parameter 332 configures the voice calling service to employ a first voice calling list, List A, while the service parameter 334 configures the voice calling service to employ a second voice calling list, List B. For this embodiment, List A may be business contacts, while List B may be personal contacts. Of course, these services (310, 320 and 330) are exemplary, as are the associated service parameters described herein. Numerous other services and/or service parameters exist and the invention is not limited to these particular examples.

Referring now to FIG. 4, diagrams illustrating multiple subscriber profile sets that comprise respective configurations for the services described with respect to FIG. 3 are depicted. In this respect, a first profile set 410 includes a profile designator 412. For the profile set 410, the profile designator 412 has been denoted "One", for the sake of discussion. Alternatively, a subscriber may define his/her respective profile sets with descriptive designators, such as "Business", "Home", "Vacation", etc. As may be seen in FIG. 4, the profile set 410 also includes a first state indicator 414 that designates that Service A (voicemail) is active (as opposed to inactive). The profile set 410 also includes a corresponding service parameter list 420 for Service A, which comprises parameters A1 and A4. As may be seen with reference to FIG. 3, for the profile set 410, the voicemail service 310 is configured to send all calls (per parameter A1) to voicemail and to play the subscriber's alternate greeting (per parameter A4) when answering those calls.

The profile set 410 further includes a second state indicator 416, which indicates that Service B (call forwarding) is inactive for this profile. Because Service B is inactive for this profile, service parameters are not defined for Service B in the profile set 410.

The profile set 410 further includes a third state indicator 418, indicating that Service C (voice calling) is active with a corresponding service parameter list 422, which comprises parameter C1. Referring again to FIG. 3, for the profile set 410 voice calling service 330 is configured to be active and use List A for voice calls (per parameter C1).

The profile set 410 also has a corresponding feature code 424. The feature code 424 comprises a character string that may be used by a subscriber to indicate which profile set of the multiple profile sets the subscriber desires to be the currently active profile set. In this regard, the feature code 424 comprises the character string '*631', which a user may enter at a subscriber terminal, such as the subscriber terminal 135 shown in FIG. 1. In response to the subscriber entering the feature code, the serving system 105 (or other entity, such as the CCP 125) may initiate a message to the SMS 130 to indicate that the subscriber desires that the profile set 410 be a currently active profile for the subscriber, as was discussed with respect FIGS. 1 and 2.

For the situation where the serving system initiates signaling the SMS 130 in response to the subscriber entering the feature code 424, the communication system 100 may operate as an advanced intelligent network, as is known. For such an embodiment, the serving system 105 may include a number of "trigger points", such as the entry of a feature code (which may be indicated by the '*' key being the first key of a sequence). In response to encountering such a trigger point, the serving system 105 executes corresponding service logic, such as logic to generate a signal to the SMS 130 to indicate that the profile set 410 has been selected as the currently active profile set. Of course, other trigger points and other signaling approaches (such as passing the entered key sequence to the CCP 125 to signal the SMS 130) may be used, and the invention is not limited to these particular examples.

Referring again to FIG. 4, a second profile set 430 is also illustrated. The profile set 430 comprises a profile designator 432, which is defined as "Two." The profile set 430 further comprises state indicator 434 to indicate that Service A is active with service parameter list 440, which comprises the parameters A2 and A3. The profile set 430 further comprises a second state indicator 436 to indicate that Service B is active with service parameter list 442, which comprises the parameters B4 and B3. The profile set 430 also comprises a third state indicator 438 indicating that Service C is active with service parameter list 444, which comprises the parameter C2. In a similar fashion as the profile set 410, the profile set 430 also has a feature code 446 that may be used to select the profile set 430 as a currently active profile using techniques such as those that have been previously described.

Thus, when the profile set 430 is made the currently active profile set, the voicemail service 310 is active with all callers not on List 1 being sent voice mail and the main greeting is used for answering these calls. Also, the call forwarding service is active with urgent calls being forwarded to phone number (555) 987-6543. Additionally, when the profile set 430 is the active profile set, the voice calling service 330 is active with List B available for voice calling. The profile sets are exemplary and are not limiting to the scope of the invention.

Alternative Exemplary Embodiment for Selecting a Profile

Figure 5:
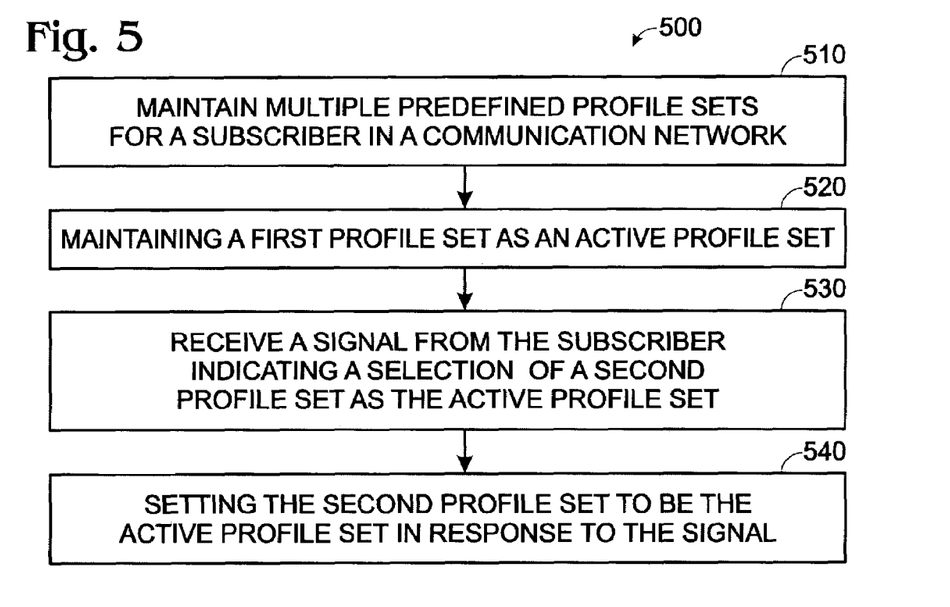
FIG. 5; is a flowchart illustrating an alternative method for managing profile sets in accordance with an exemplary embodiment of the invention.

FIG. 5 is a flowchart that illustrates an alternative method 500 for selecting a subscriber profile set from multiple predefined profile sets in accordance with another exemplary embodiment of the invention. At 510, the method 500 comprises maintaining multiple predefined profile sets for a given subscriber in a communication system and/or network. As has been previously described, each predefined profile set defines respective configurations of multiple network services for the subscriber. These predefined profile sets include a first profile set that defines a first configuration of a first service and a second configuration of a second service. The predefined profile sets further include a second profile set that defines a third configuration of the first service and a fourth configuration of the second service. An example of such a scenario is demonstrated in FIG. 4 by the configurations defined for Service A and Service B in the profile sets 410 and 430.

At 520, a designation of the first profile set (profile set 410) as an active profile set for the subscriber in the communication network is maintained. Thus, in the context of the profile sets shown in FIG. 4 the first service (Service A) is configured for the subscriber according to the first configuration (with parameters A1 and A4) and the second service (Service B) is configured for the subscriber according to the second configuration (inactive). At 530, a signal from the subscriber indicating a selection of the second profile set (profile set 430) to be the active profile set is received, such as by an SMS.

In response to the signal, the second profile set is set to be the active profile set at 540. This may be accomplished in any number of ways, such as those previously described. Thus, after the second profile set is set to be the active profile set, the first service (Service A) is configured for the subscriber according to the third configuration (with parameters A2 and A3) and the second service (Service B) is configured for the subscriber according to the fourth configuration (with parameters B1 and B3).

Exemplary Embodiment for Defining Subscriber Profile Sets

Figure 6:
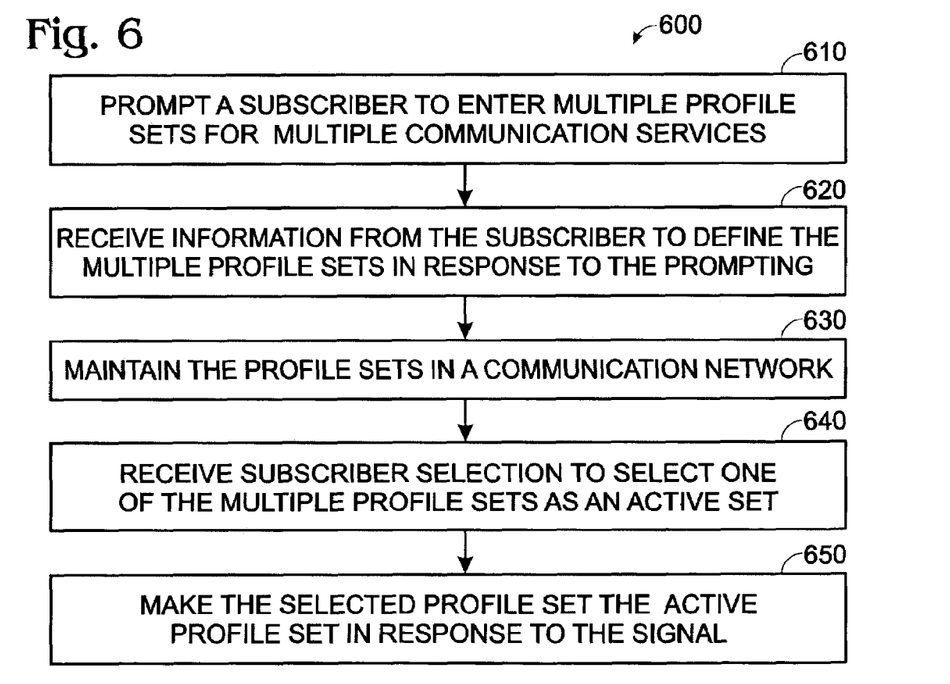
FIG. 6, is a flowchart illustrating a method for defining multiple profile sets in accordance with an exemplary embodiment of the invention.

Referring now to FIG. 6, a flowchart illustrating a method 600 for defining multiple profile sets in accordance with an exemplary embodiment of the invention is depicted. At 610, the method 600 includes prompting a subscriber to enter multiple profile sets. As has been previously descried, each of the multiple profile sets defines respective configurations for multiple communication services to which the subscriber subscribes, such as in the profile sets 410 and 430 shown in FIG. 4. At 620, information is received from the subscriber to define the multiple profile sets, the information being responsive to the prompting at 610. Such information may include, as for the profile set 410 shown in FIG. 4, a profile designator 412, state indicators 414, 416 and 420 to indicate whether the services are active or inactive and service parameter lists 420, 422, that correspond to the services. Of course, other arrangements for such profile sets are possible.

While the invention is not limited to any particular technique, the method 600 may be implemented using an interactive voice response unit (IVRU) of a known type. In this regard, the IVRU may generate a series of prompts to the subscriber and then capture responses from to those prompts. The subscriber's responses may then compiled, either by the IVRU or another platform in the communications system (such as a CCP or SMS) and the multiple predefined profile sets may be generated using those responses. Of course other techniques exist, such as for example, an Internet and/or a World Wide Web (e.g., a packet network based) interface may be used.

Figure 7:
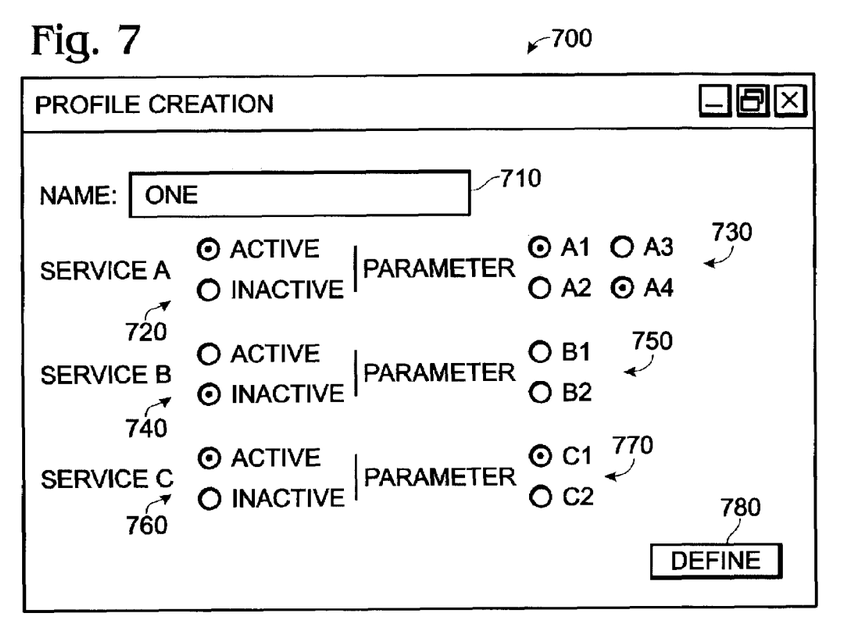
FIG. 7 is a diagram illustrating a World Wide Web based interface in accordance with an exemplary embodiment of the invention.

In this regard, FIG. 7 is a diagram showing a web interface 700 that may be employed to define multiple profile sets in accordance with embodiments of the invention. The web interface 700 may comprise a web page or a web card, though the specific implementation is not critical. The web interface 700 comprises a profile designator entry field 710. A subscriber may employ the profile designator field 700 to assign a descriptive name to each of his/her respective multiple profile sets. For this example, the profile set is designated "One", in correspondence with the profile set 410 shown in FIG. 4.

For the profile set 410, Service A is indicated to be active using state indicator radio buttons 720, while service parameter list radio buttons 730 are used to indicate that parameters A1 and A4 are to be used for Service A with profile "One." The state indicator radio buttons 740 are used to designate that Service B is inactive profile for profile set "One." Thus, service parameter list radio buttons 750 define no service parameters for Service B for profile "One." The state indicator radio buttons 760 are used to designate that Service C is active for profile set "One", and service parameter list radio buttons 770 are used to indicate that parameter C1 is to be used with Service C for profile "One." The web interface further includes a "Define" button 780 that is used to save the profile set "One" to the communications system/network. The system then stores the profile set on one more platforms included and or coupled with the system, such as a CCP and/or a SMS, as two examples.

Exemplary Communication System

Figure 8:
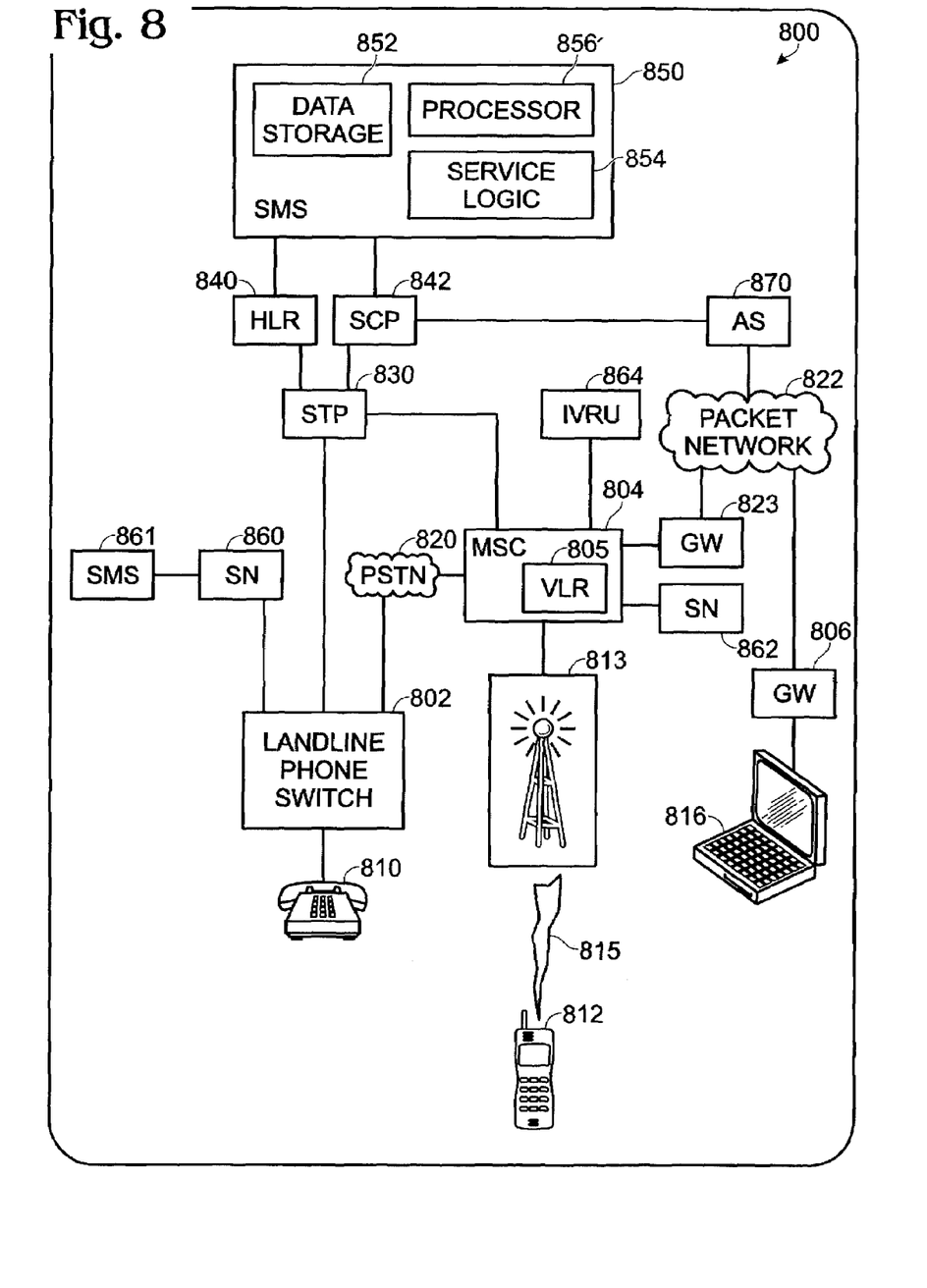
FIG. 8 is a block diagram illustrating, in more detail than the diagram of FIG. 2, a communication network in which an exemplary embodiment of the invention can be employed.

Referring now to FIG. 8, a more detailed block diagram (as compared to the communication system of FIG. 1) of a communication system 800 in which exemplary embodiments of the invention may be implement is depicted. Various elements of the communication system 800 are analogous with elements of the communication system 100, and those elements will be noted to further clarify how embodiments implemented in such systems may function.

The communication system 800 includes a plurality of servings systems in similar fashion as the communication system 100. In this respect, the system 800 includes a landline phone switch 802, a mobile switching center (MSC) 804, which includes a visitor location record (VLR) 805, and a gateway (GW) 806. These serving systems may take a variety of forms. For example, the landline switch 802 may comprise a public-branch exchange that includes a computer telephony interface. Alternatively, landline switch 802 may comprise a signal switching point, such as for public telephone service.

The MSC 804 may comprise any number of mobile switching configurations, such as, without limitation, mobile switches that support advanced intelligent network operations, such as trigger points. The VLR included in the MSC may comprise local profiles for subscribers connected with the MSC 804 and these profiles may be modified to correspond with currently active profiles sets in accordance with exemplary embodiments of the invention, as are described herein.

The GW 806 may comprise a call agent system for managing packet based Internet telephony communications. Alternatively, the GW 806 may comprise a home agent/foreign agent arrangement for supporting mobile IP. Of course, these are example serving systems, and other such systems exist and may be employed in system 800.

The system 800 also comprises a plurality of subscriber terminals (such as the subscriber terminal 135 of FIG. 1). These subscriber terminals take the form of a landline telephone 810, a wireless device 812 and a computing device 816. The landline phone 810 is communicatively coupled with the landline phone switch 802 and may comprise any number of such phones including, but not limited to, analog phones and digital phones. The wireless device 812 may comprise any number of devices, such as a wireless phone, a wireless personal digital assistant, and/or a wireless Internet appliance. The wireless device 812 is coupled with the MSC 804 via a mobile base station (e.g., radio tower) 813 and an air interface 815, which are known. The computing device 816 is communicatively coupled with the GW 806, such as via a packet based data network. The computing device 816 may also take various forms, such as a personal data assistant, a personal computer, a laptop computer and/or a handheld computer. Of course, other possible devices exist, such as Internet appliances and/or tablet computers.

The communication system 800 also comprises plural transport networks, as was discussed with respect to FIG. 1. The transport networks of system 800 take the form of a public-switched telephone network 820 and a packet based network 822. The packet based network 822 is coupled with the MSC 804 via a gateway 823, which provides an interface between the MSC 804 and the packet based network 822, such as to provide World Wide Web services to wireless devices coupled with the MSC 804, so as to provide for profile set selection and/or definition, as has been discussed.

The system 800 further comprises a signaling system in similar fashion to the system 100. The signaling system of the system 800 takes the form of a signal transfer point (STP) 830 (such as a Tekelec Eagle platform) for this embodiment. The STP 830 is coupled with the landline switch 802 and the MSC 804 and is further coupled with (central control points) a home location register (HLR) 840, which may take the form of a Lucent eSM, and a service control point (SCP) 842, such as the Telcordia ISCP. As is known, the HLR 840 is a central control point for the MSC 804 and may comprise profiles for subscribers using the MSC 804. Likewise, the SCP may also contain profile information for subscribers of the system 800. Furthermore, the HLR 840 and the SCP 842 may also provide one or more of the multiple services that are configured by employing multiple profile sets in accordance with embodiments of the invention.

The HLR 840 and the SCP 842 are further coupled with an SMS 850, as was also discussed with reference to FIG. 1. The SMS 850 includes data storage 852, service logic 854 and a processor 856. It will be appreciated that the elements of the SMS 850 may also be included in any number of platforms in the system 800, such as the HLR 840 and/or the SCP 842, and the invention is not limited to implementing such elements in the SMS 850.

The data storage 852 may be used to maintain the respective predefined profile sets for subscribers of system 800. The data storage 852 may also be used to maintain a designation as to which profile set of a respective subscriber is the currently active profile set for the subscriber. When a signal is received to make another profile set for the subscriber the currently active profile set, the SMS 850 changes the active profile designation in the data storage 852. The SMS 850 also executes the service logic 854 using processor 856 to make the selected profile set the currently active profile set. The executed logic 854 makes the selected profile set the currently active profile set in the system 800 by causing the SMS 850 to signal to one or more platforms that provide the multiple services to which the subscriber subscribes. This signaling results in the platform(s) updating corresponding local profile(s) for the subscriber in accordance with the currently active profile set. This signaling may be done in any number of ways, as has been previously discussed.

Some or all of the multiple services may be provided, for example, by service nodes 860 and 862, or by an IVRU 864, which may implement a voicemail service, for example. Another SMS 861 is coupled with the SN 860. In this respect, each entity in the system 800 that provides services to subscribers may have a corresponding SMS (either implemented as part of the entity, or as a separate platform). Alternatively, the entities in the system 800 that provide services to subscribers may use a central SMS, such as is illustrated in FIG. 1. The invention is, of course, not limited in this respect and other configurations for implementing SMSs in systems such as the system 800 are possible.

Additionally, one or more of the multiple services may be implemented using an application server 870, which is coupled between the SCP 842 and the packet network 822. The AS 870 may also function as a World Wide Web server to implement WWW interfaces, such as interface 700, for defining and/or selecting profile sets for a subscriber in accordance with exemplary embodiments of the invention.

CONCLUSION

Exemplary arrangements of the present invention have been described. Those skilled in the art will understand, however, that changes and modifications may be made to these arrangements without departing from the true scope and spirit of the present invention, which is defined by the claims.

We claim:

1. A profile management method comprising:
maintaining, at a service control point (SCP), multiple predefined profile sets for a telecommunications device in a communication network, each predefined profile set defining a respective configuration of multiple services to which the telecommunications device subscribes;
receiving, at a mobile switching center (MSC), a request from a user to make a given one of the predefined profile sets an active set for the telecommunications device, and forwarding the request from the MSC, via a signaling network, to the SCP; and
at the SCP, responsively making the given predefined profile set an active set for the telecommunications device,
wherein the multiple services to which the telecommunications device subscribes are implemented on a plurality of platforms in the communication network; and
making the given profile set the active set comprises signaling from the SCP to the plurality of platforms and responsively executing logic to update respective local profiles for the telecommunications device on the plurality of platforms, wherein executing the logic provisions the multiple services in correspondence with the active set.

2. The method of claim 1, wherein the plurality of platforms comprise at least one of a mobile switching center, an application server, a home location register, a visitor location register, a user terminal, and a communications service node.

3. The method of claim 1, wherein the respective configuration for each predefined profile set comprises:
an indication whether each of the multiple services is active or inactive; and
operation parameters for the multiple services.

4. The method of claim 1, wherein receiving the request from the user comprises receiving a signal from a user terminal via a serving system, a signal transfer point and a home location register.

5. The method of claim 1, wherein receiving the request from the user comprises receiving a feature-code selection entered on a user terminal, the feature-code selection corresponding with the given profile set.

6. A method for managing profile sets for a telecommunications device comprising:
prompting a user to enter multiple profile sets, wherein each of the multiple profile sets defines a respective configuration of multiple communication services to which the telecommunications device subscribes, wherein the multiple communication services are implemented on a plurality of platforms in a communication network;
receiving information from the user to define the multiple profile sets, the information being responsive to the prompting;
maintaining the multiple profile sets at a service control point (SCP) in a communication network;
at the SCP, receiving a request from the user, via a mobile switching center (MSC), to make a given profile set of the multiple profile sets an active set for the telecommunications device; and
at the SCP, responsive to the request, making the given profile set the active profile set for the telecommunications device, wherein making the given profile set the active profile set comprises signaling from the SCP to the plurality of platforms to cause the plurality of platforms to configure services in accordance with the given profile.

7. The method of claim 6, wherein prompting the user comprises providing a series of prompts using an interactive voice response unit.

8. The method of claim 6, wherein prompting the user comprises providing a graphical user interface over a packet network.

9. The method of claim 8, wherein the packet network is the Internet.

10. The method of claim 9, wherein the interface is a World Wide Web based interface.

11. The method of claim 6, wherein receiving the information to define the multiple profile sets comprises, for each profile set:
receiving a profile designator;
receiving designations of which of the multiple services are to be active or inactive; and
receiving operation parameters for the multiple services.

12. The method of claim 6, wherein receiving the request from the user indicating the given profile set comprises receiving a feature-code selection entered on a user terminal, the feature-code selection corresponding to the given profile set and initiating a trigger point in the MSC.

13. A communication system comprising:
a communication network;
a service control point;
data storage having multiple predefined profile sets for a telecommunications device stored thereon, the data storage being operatively coupled with the service control point (SCP), wherein each of the multiple profile sets defines a respective configuration of multiple services to which the telecommunications device subscribes, the multiple services being operable on a plurality of platforms included in the communication network; and
a communication entity operable by a user, the communication entity being communicatively coupled with the communication network, such that the communication entity, when employed by the user, transmits a request to the SCP via a mobile switching center (MSC) included in the communication network, the request indicating a given profile set of the multiple profile sets as an active set for the telecommunications device, wherein the SCP, in response to the request, sets the given profile set to be an active set for the telecommunications device, signaling to the plurality of platforms to cause the plurality of platforms to configure services in accordance with the given profile.

14. The system of claim 13, wherein the communication entity comprises a user terminal.

15. The system of claim 14, wherein the user terminal comprises one of a wireless phone, a personal digital assistant, a personal computer, a laptop computer and a handheld computer.

16. The system of claim 13, wherein each profile set of the multiple profile sets comprises:
a profile designator;
an indication whether each of the multiple services is active or inactive; and
operation parameters for the multiple services.

17. The system of claim 13, further comprising a WWW interface including logic that, when executed, generates the multiple predefined profile sets based on information entered by the user.

18. The system of claim 13, further comprising a feature-code selection system including logic to generate the request to indicate the given profile set.

19. The system of claim 13, further comprising an interactive voice response unit including logic that, when executed,
   generates a series of prompts to the user; and
   generates the multiple predefined profile sets based on information entered by the user in response to the series of prompts.

20. A profile management method comprising:
   maintaining multiple predefined profile sets for a given telecommunications device at a service control point (SCP) in a communication network, each predefined profile set defining respective configurations of a plurality of network services for the telecommunications device, including (i) a first profile set that defines a first configuration of a first service and a second configuration of a second service and (ii) a second profile set that defines a third configuration of the first service and a fourth configuration of the second service, wherein the plurality of network services are operable on a plurality of network platforms;

maintaining a designation of the first profile set as an active profile set for the telecommunications device in the SCP, so that the first service is configured for the telecommunications device according to the first configuration and the second service is configured for the telecommunications device according to the second configuration;

receiving a signal from a user indicating a user-selection of the second profile set to be the active profile set, the signal being generated as a result of a trigger point being encountered in a mobile switching center (MSC); and at the SCP, responsive to the signal, setting the second profile set as the active profile set for the telecommunications device, signaling to the plurality of network platforms to configure the first service for the telecommunications device according to the third configuration and to configure the second service for the telecommunications device according to the fourth configuration.

* * * * *